US008871285B2

(12) United States Patent
Markoulis et al.

(10) Patent No.: US 8,871,285 B2
(45) Date of Patent: Oct. 28, 2014

(54) METHOD FOR MAKING A TWO COMPONENT BEVERAGE AND ASSOCIATED TWO COMPARTMENT CONTAINER

(75) Inventors: Shelley Markoulis, Wycoff, NJ (US); Piaras Valdis de Cleir, Tarrytown, NY (US); Paul Edward Doll, Madison, WI (US); Niketa Mohler, Ossining, NY (US); Stuart Leslie, Larchmont, NY (US); Diya Sen, Forest Hills, NY (US); Jason Billig, Mount Vernon, NY (US)

(73) Assignee: Kraft Foods Group Brands LLC, Northfield, IL (US)

( * ) Notice: Subject to any disclaimer, the term of this patent is extended or adjusted under 35 U.S.C. 154(b) by 1 day.

(21) Appl. No.: 13/458,953

(22) Filed: Apr. 27, 2012

(65) Prior Publication Data

US 2013/0108739 A1    May 2, 2013

Related U.S. Application Data

(60) Provisional application No. 61/551,878, filed on Oct. 26, 2011.

(51) Int. Cl.
| | | |
|---|---|---|
| A22C 13/00 | (2006.01) | |
| B65D 81/34 | (2006.01) | |
| B65D 55/00 | (2006.01) | |
| A23L 2/00 | (2006.01) | |
| B65D 25/08 | (2006.01) | |
| B65D 85/816 | (2006.01) | |
| A47J 31/00 | (2006.01) | |
| A47J 31/40 | (2006.01) | |

(52) U.S. Cl.
CPC .............. *A47J 31/002* (2013.01); *B65D 85/816* (2013.01); *A47J 31/401* (2013.01)
USPC ............. 426/87; 426/110; 426/232; 426/590; 206/219

(58) Field of Classification Search
CPC ............................. A47J 31/002; A47J 31/401
USPC ............... 426/87, 77, 86, 112, 115, 120, 590, 426/593–599, 519; 209/219
See application file for complete search history.

(56) References Cited

U.S. PATENT DOCUMENTS

| 604,514 A | 5/1898 | Belden |
|---|---|---|
| 1,331,372 A | 2/1920 | Popper |

(Continued)

FOREIGN PATENT DOCUMENTS

| EP | 0272922 A2 | 6/1988 |
|---|---|---|
| EP | 1 985 213 A1 | 10/2008 |

(Continued)

OTHER PUBLICATIONS

Machine Translation Mahlich WO2011/000445. Mar. 2010.*

(Continued)

*Primary Examiner* — Rena L Dye
*Assistant Examiner* — Lela S Williams
(74) *Attorney, Agent, or Firm* — Fitch, Even, Tabin & Flannery LLP

(57) ABSTRACT

A method is provided for forming a two component beverage using a container having two compartments, an upper compartment and a lower compartment, each containing a beverage ingredient. The upper compartment contains a first beverage ingredient, such as powdered milk, and the lower compartment 8 contains a second beverage ingredient, such as instant coffee. The upper compartment can be stacked above the lower compartment such that access to the lower compartment is through the upper compartment.

11 Claims, 18 Drawing Sheets

(56) References Cited

U.S. PATENT DOCUMENTS

| | | |
|---|---|---|
| 2,968,560 A | 1/1961 | Goros |
| 3,057,536 A | 10/1962 | Warnsdorfer, Jr. et al. |
| 3,128,029 A | 4/1964 | Price et al. |
| 3,186,850 A | 6/1965 | Anthony |
| 3,275,448 A | 9/1966 | Sommer |
| 3,443,714 A | 5/1969 | Edwards |
| 3,924,741 A | 12/1975 | Kachur et al. |
| 4,039,435 A | 8/1977 | Narva |
| 4,061,782 A | 12/1977 | Baxter |
| 4,081,560 A | 3/1978 | Ishigaki |
| 4,387,809 A | 6/1983 | Botzler |
| 4,478,858 A | 10/1984 | Baird et al. |
| D288,527 S | 3/1987 | Maguire |
| D297,119 S | 8/1988 | Fontana et al. |
| 4,762,224 A | 8/1988 | Hall |
| 4,874,618 A | 10/1989 | Seaborne et al. |
| 5,064,073 A | 11/1991 | Folland |
| 5,088,627 A | 2/1992 | Musel |
| 5,143,261 A | 9/1992 | Drobish |
| D339,522 S | 9/1993 | Zoss |
| 5,242,077 A * | 9/1993 | Smith et al. .................. 220/529 |
| D394,204 S | 5/1998 | Seddon |
| 5,875,888 A | 3/1999 | Albisetti |
| 5,950,913 A | 9/1999 | Rea et al. |
| 6,042,858 A | 3/2000 | Kairys |
| 6,250,346 B1 | 6/2001 | Castillo |
| 6,263,923 B1 | 7/2001 | Castillo |
| 6,287,612 B1 | 9/2001 | Mandava et al. |
| 6,363,978 B2 | 4/2002 | Castillo |
| 6,412,526 B2 | 7/2002 | Castillo |
| D473,788 S | 4/2003 | Chen et al. |
| 6,569,486 B2 | 5/2003 | Cirkel-Egner et al. |
| 6,726,950 B2 | 4/2004 | Yuzawa |
| D507,174 S | 7/2005 | Katz et al. |
| D515,880 S | 2/2006 | Lerner |
| D593,407 S | 6/2009 | Seo |
| D617,043 S | 6/2010 | Patel et al. |
| D621,718 S | 8/2010 | Mehdizadeh |
| D629,243 S | 12/2010 | Meyl et al. |
| D629,681 S | 12/2010 | Ehrmann |
| D643,284 S | 8/2011 | Zomorodi et al. |
| D643,285 S | 8/2011 | Zomorodi et al. |
| D643,286 S | 8/2011 | Zomorodi et al. |
| D645,340 S | 9/2011 | Menard et al. |
| D646,968 S | 10/2011 | Ortiz et al. |
| D656,009 S | 3/2012 | Ortiz et al. |
| D656,010 S | 3/2012 | Ortiz et al. |
| D671,831 S | 12/2012 | Moreau |
| 2003/0222089 A1 | 12/2003 | Hale |
| 2004/0121050 A1 * | 6/2004 | Thurman et al. ............... 426/120 |
| 2005/0266122 A1 | 12/2005 | Franceshi |
| 2006/0280844 A1 | 12/2006 | Succar et al. |
| 2006/0280845 A1 | 12/2006 | Succar et al. |
| 2007/0193894 A1 | 8/2007 | Macken et al. |
| 2008/0089983 A1 | 4/2008 | Coste |
| 2008/0171108 A1 | 7/2008 | Dierikx |
| 2009/0092711 A1 | 4/2009 | Ninh et al. |
| 2009/0114650 A1 | 5/2009 | Houston, Jr. et al. |
| 2009/0258115 A1 | 10/2009 | Minfray |
| 2010/0012658 A1 | 1/2010 | Karangelen |
| 2010/0320212 A1 | 12/2010 | Cai |
| 2011/0117251 A1 | 5/2011 | Waddrup et al. |

FOREIGN PATENT DOCUMENTS

| | | |
|---|---|---|
| FR | 2 205 045 A5 | 5/1974 |
| GB | 1427375 A | 3/1976 |
| JP | 11349060 A2 | 12/1999 |
| JP | 2002095416 A | 4/2002 |
| JP | 2002102068 A | 4/2002 |
| JP | 10211953 A | 7/2003 |
| JP | 2003237786 A | 8/2003 |
| JP | 2004182271 A | 7/2004 |
| JP | 2007331756 A | 12/2007 |
| WO | 9523744 | 9/1995 |
| WO | 2005037678 | 4/2005 |
| WO | 2006125489 | 11/2006 |
| WO | 2006127186 | 11/2006 |
| WO | 2009109073 | 9/2009 |
| WO | 2011000445 | 1/2011 |

OTHER PUBLICATIONS http://www.houzz.com/photos/267275/Lunch-Pot-contemporary-food-containers-and-storage- (Internet Archive Date Oct. 17, 2011).*
International Search Report issued on Jan. 15, 2013 in International Application No. PCT/US2012/061854 (10 pages).
"Deli Pot Topper" Pregis, May 2013.

* cited by examiner

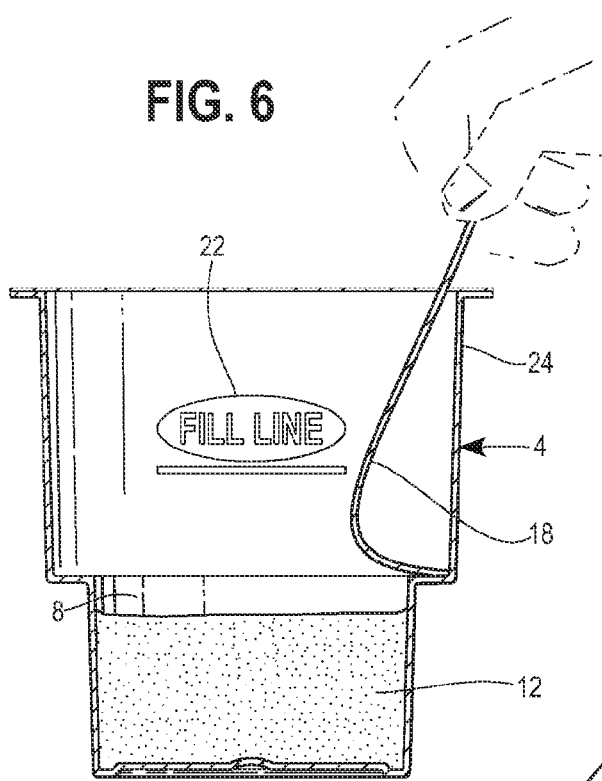
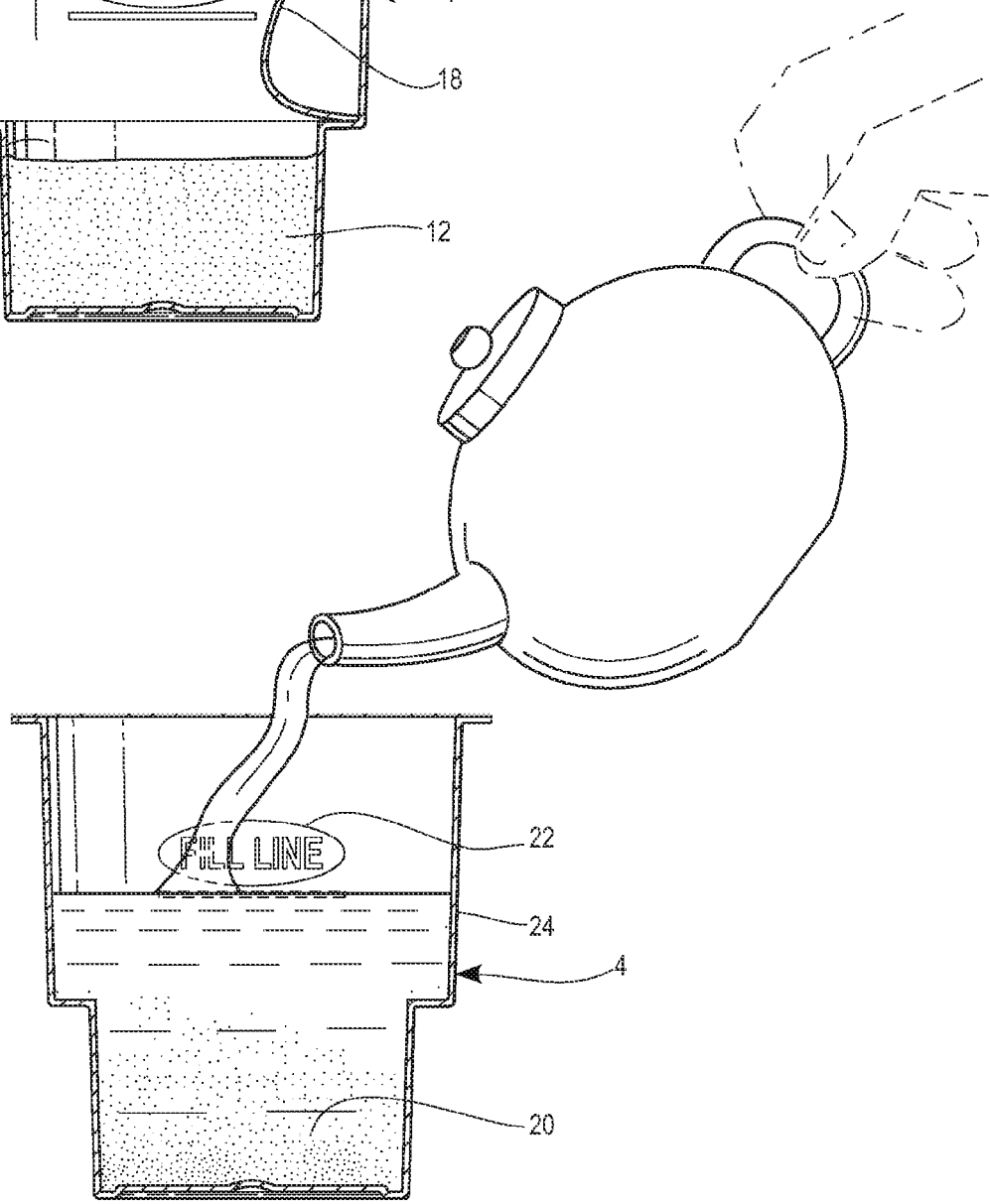

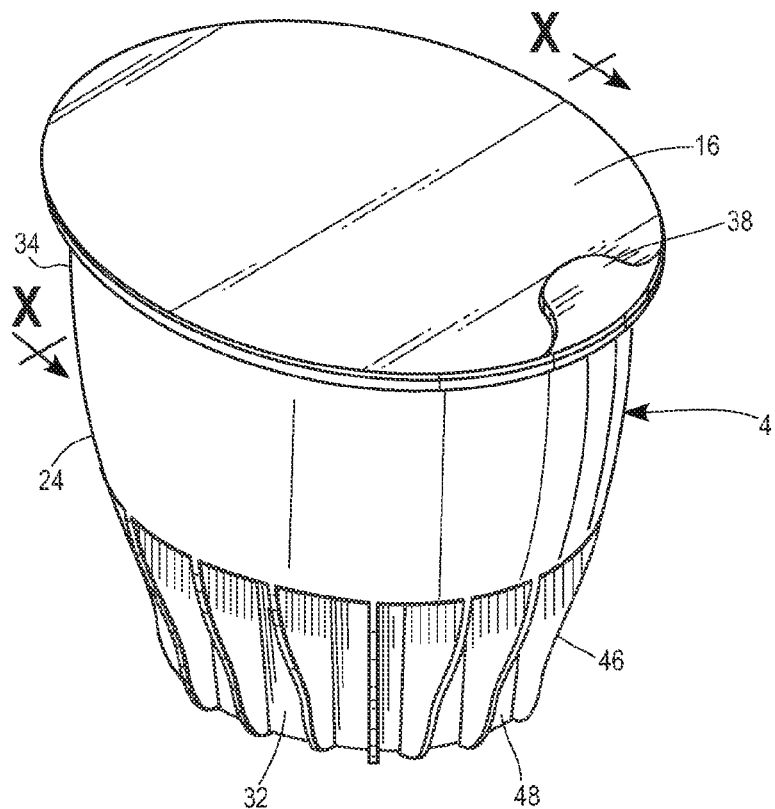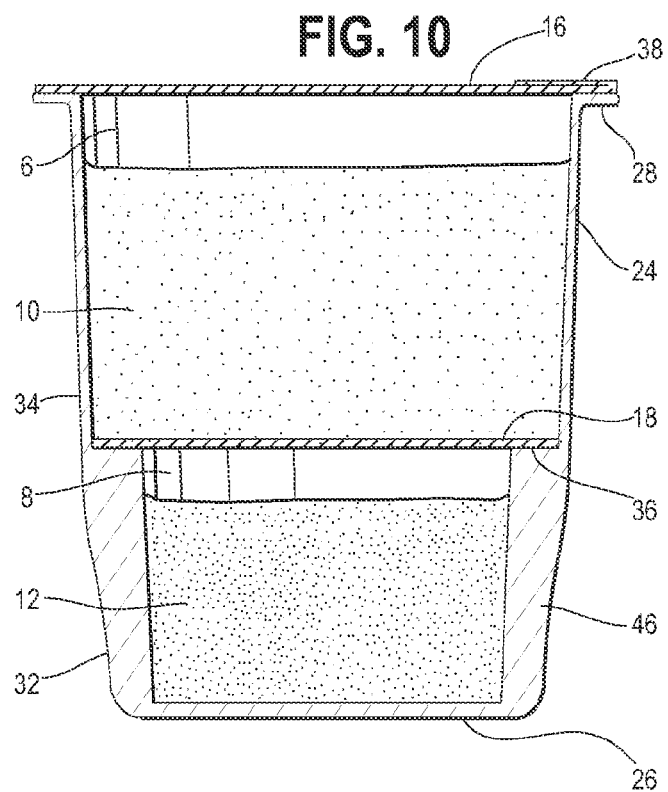

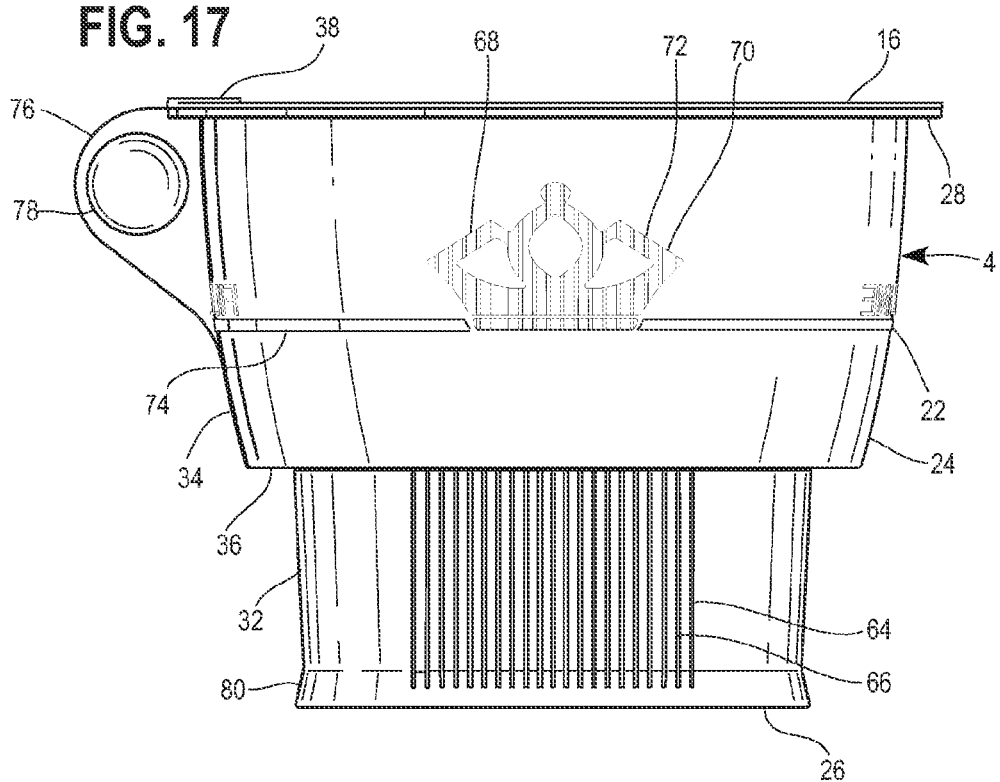
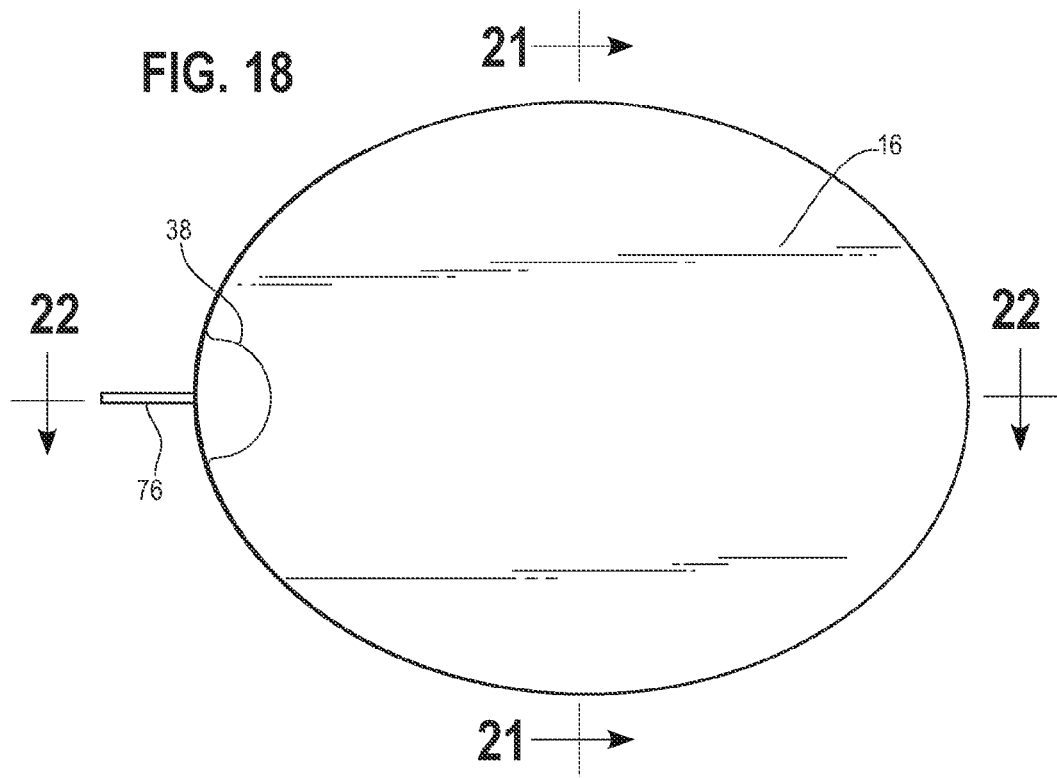

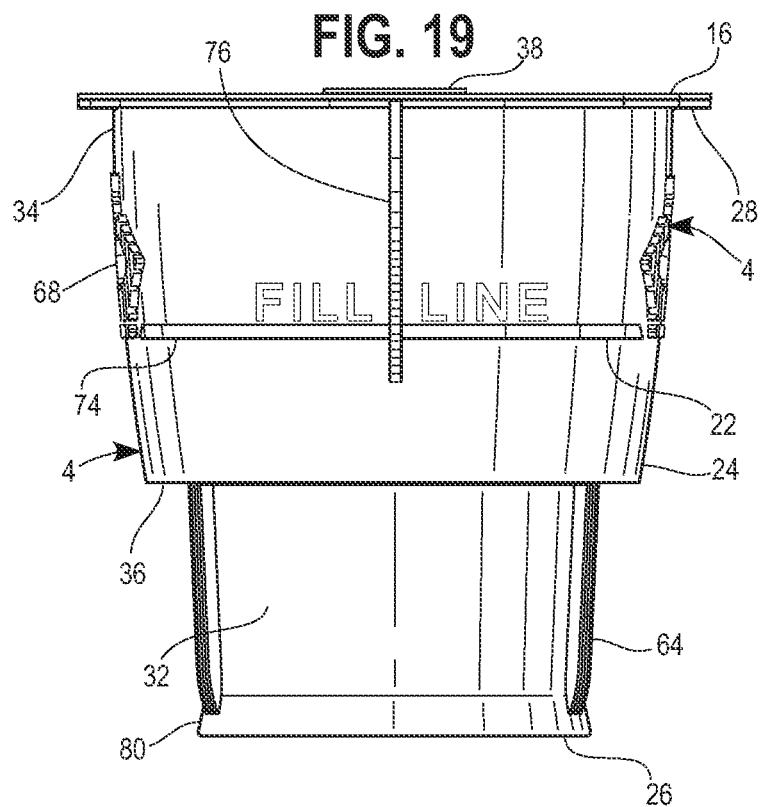
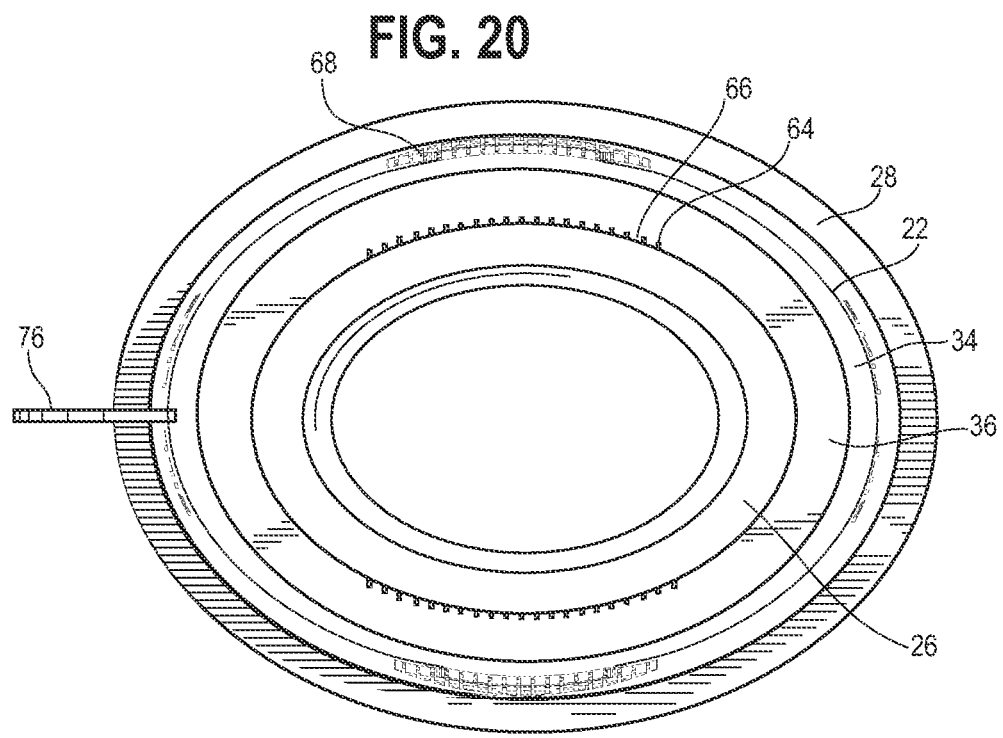

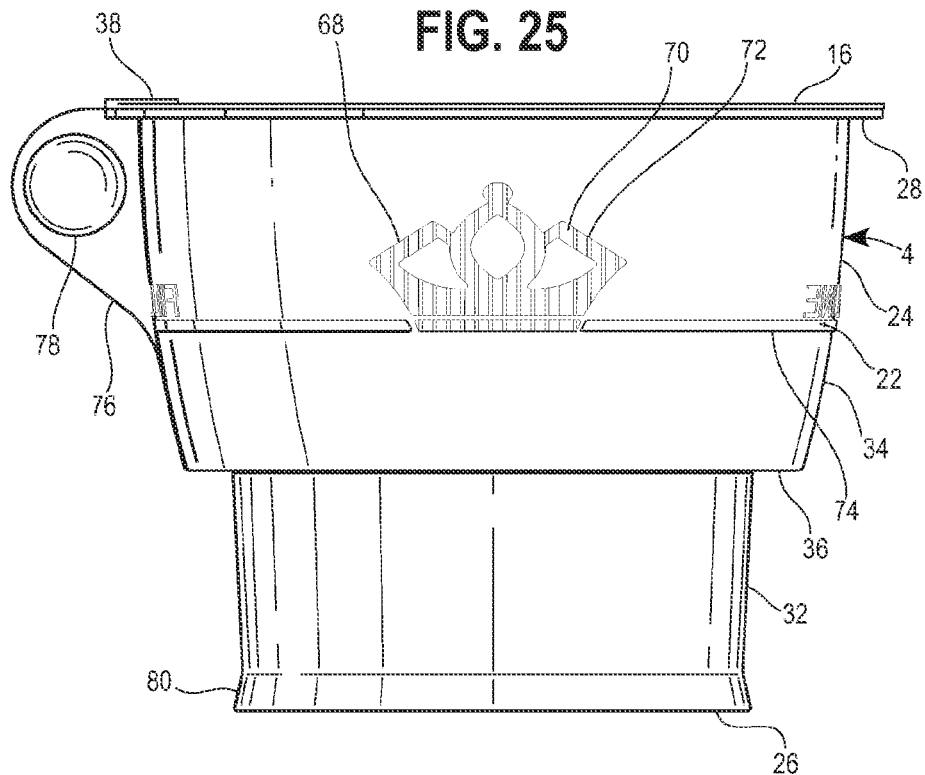
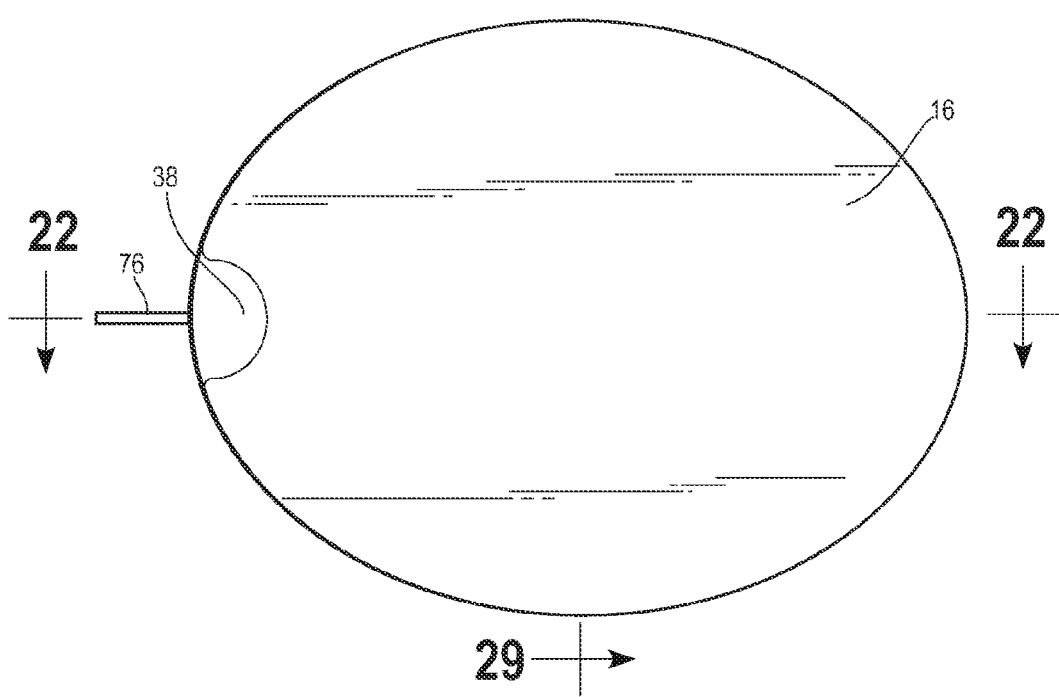

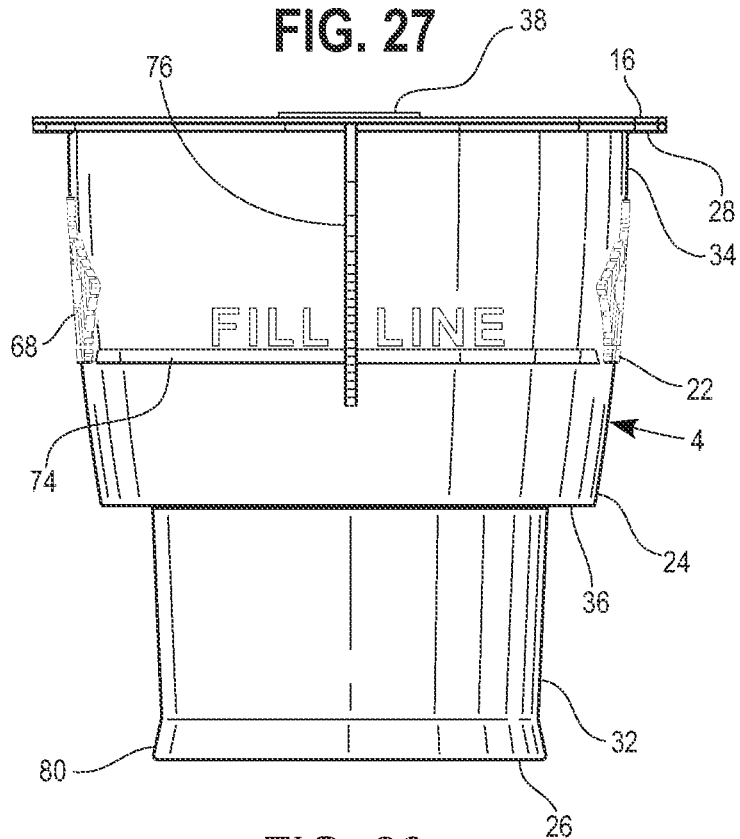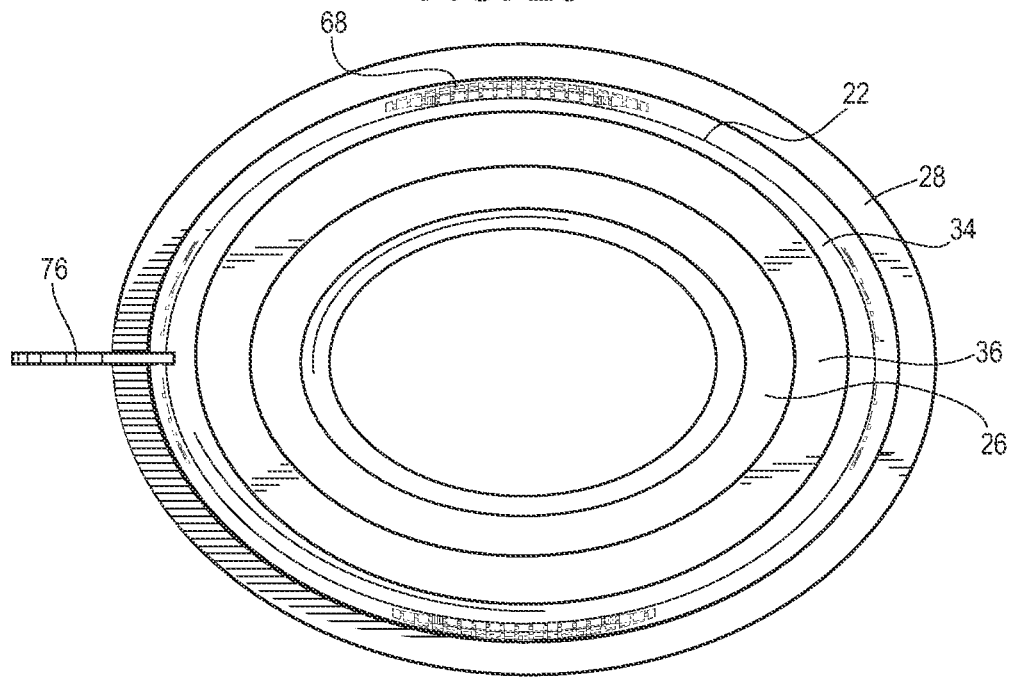

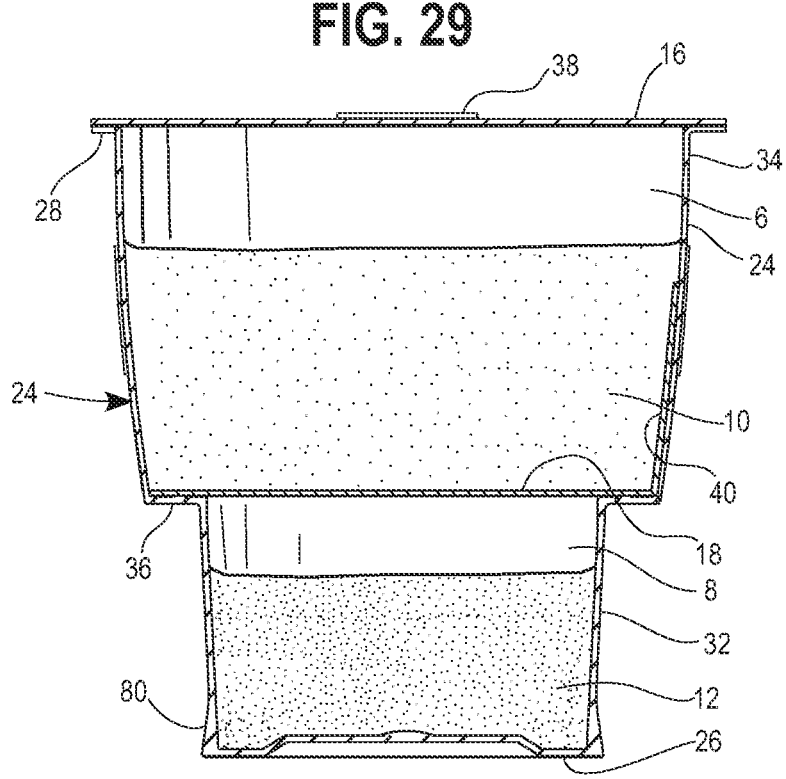

METHOD FOR MAKING A TWO COMPONENT BEVERAGE AND ASSOCIATED TWO COMPARTMENT CONTAINER

CROSS-REFERENCE TO RELATED APPLICATION

This application claims the benefit of U.S. Patent Appl. No. 61/551,878, filed Oct. 26, 2011, which is hereby incorporated by reference in its entirety.

FIELD

A method for making a two component beverage is provided, and, in particular, a method for making a two component beverage using ingredients stored in a two compartment container.

BACKGROUND

Certain coffee beverages are formed from combining two different beverage ingredients in a specific order. For example, a latte beverage can be prepared by adding coffee to a cup already containing milk. A different beverage can result if the milk is added to the coffee.

One system for forming a two component beverage includes two packets of powdered beverage ingredient. One of the packets can include powdered milk, and the other instant coffee. The packets can each be separately combined with hot liquid to form different beverage components. The components can then be combined to form a two component beverage. However, as discussed above, if the order of the combination is varied from what is instructed, a different beverage can result. While instructions may be provided as to the preferred order of combination to form a specific two component beverage, the instructions may be inadvertently not followed, potentially resulting in a two component beverage different than what a consumer expects.

SUMMARY

A method is provided for forming a two component beverage in a cup using a two compartment container. The method includes accessing an upper compartment of the two compartment container containing a first beverage ingredient, blocking access to a lower compartment of the two compartment container using the first beverage ingredient, emptying the first beverage component from the two compartment container into the cup in providing access to the lower compartment of the two compartment container containing a second beverage ingredient, combining a liquid with the first beverage ingredient in the cup to form a first beverage component, combining a liquid with the second beverage ingredient in the two compartment container to form a second beverage component, and pouring the second beverage component into the cup to combine with the first beverage component to form the two component beverage. The first and second beverage ingredients can be different.

The step of accessing an upper compartment of the two compartment container containing a first beverage ingredient further can include the step of first removing an upper compartment lid from the container. The step of providing access to the lower compartment of the two compartment container containing a second beverage ingredient can further include the step of first removing a or compartment lid from the container. The step of combining a liquid with the second beverage ingredient in the two compartment container to form a second beverage component can include measuring the liquid using the container. The step of combining a liquid with the second beverage ingredient in the two compartment container to form a second beverage component can include filling the lower component and at least part of the upper compartment with the liquid.

The liquid combined with the first beverage ingredient in the cup to form the first beverage component can be hot water and the liquid combined with the second beverage component in the container can be hot water.

The method can further comprise the step of using the container to measure the liquid prior to the step of combining the liquid with the first beverage ingredient in the cup to form the first beverage component.

The method can further comprise the step of holding the container using means for handling the container prior to the step of pouring the second beverage component into the cup to combine with the first beverage component to form the two component beverage.

A two compartment container is also provided, which may be for use in the method described herein. The container can include a bottom wall and an upstanding sidewall, the sidewall having a lower segment and an upper segment separated by a step, where the lower segment has a circumference less than the circumference of the upper segment. An upper lid is attached to the upstanding sidewall and a lower lid is attached to the step. The container includes a lower compartment bounded by the bottom wall, the lower segment of the sidewall, and the lower lid. The lower compartment contains the second beverage ingredient. The container also includes an upper compartment bounded by the lower lid, the upper segment of the sidewall, and the upper lid. The upper compartment contains the first beverage ingredient.

The upper segment of the sidewall can have a peripheral flange and the upper lid is attached to the peripheral flange. The upper lid can have a tab that is folded to overly the remainder of the upper lid. The tab can be movable toward an unfolded position for gripping to facilitate removal of the upper lid. Instead or in addition, the lower lid can have a tab that is positioned to abut the inner side of the upper segment of the sidewall. The tab of the lower lid can be movable away from the sidewall for gripping to facilitate removal of the lower lid.

Means for handling the container can optionally be provided. In one aspect, the lower segment of the sidewall includes a plurality of outwardly extending ribs separated by recesses. The ribs can be continuous or disposed on select portions of the sidewall. In another aspect, an outer part is attached to the container to surround the bottom wall and the lower segment of the sidewall, the outer part having an outer part sidewall spaced from the lower segment of the sidewall. In yet another aspect, the flange includes a downturned segment spaced from the sidewall of the container. In another aspect, a handle can extend outwardly from the sidewall. In another aspect, a logo, indicia or the like can be provided on the sidewall and can be formed from ribs with adjacent ribs spaced by recesses.

BRIEF DESCRIPTION OF THE DRAWINGS

FIG. 6 is a section view of the container of FIG. 1 showing the first beverage ingredient having been removed and the lower lid being opened to access the second beverage ingredient in the lower compartment;

FIG. 7 is a section view of the container of FIG. 1 with the upper and lower lids and the first beverage ingredient removed, and water being added to the second beverage ingredient in the container to form a second beverage component;

FIG. 9 is perspective view of an alternative exemplary embodiment of a two compartment container containing ingredients for use with forming a two component beverage;

FIG. 10 is a section view of the container of FIG. 9 taken along line X-X thereof, and showing a first beverage ingredient in an upper compartment and a second beverage ingredient in a lower compartment, with an upper lid covering the upper compartment and a lower lid covering the lower compartment;

FIG. 17 is a left side elevation view of the container of FIG. 15, the right side elevation view being the mirror image thereof;

FIG. 18 is a top plan view of the container of FIG. 15;

FIG. 19 is a rear elevation view of the container of FIG. 15;

FIG. 20 is a bottom plan view of the container of FIG. 15;

FIG. 25 is a left side elevation view of the container of FIG. 23, the right side elevation view being the mirror image thereof;

FIG. 26 is a top plan view of the container of FIG. 23;

FIG. 27 is a rear elevation view of the container of FIG. 23;

FIG. 28 is a bottom plan view of the container of FIG. 23; and

FIG. 29 is a section view of the container of FIG. 23 taken along line XXIX-XXIX of FIG. 26.

DETAILED DESCRIPTION

Figure 2:
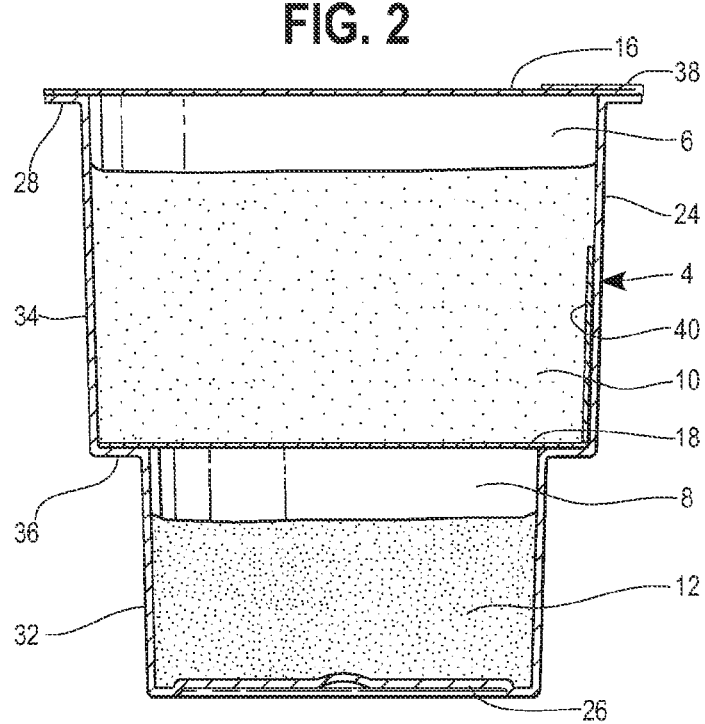
FIG. 2 is a section view of the container of FIG. 1 taken along line II-II thereof, and showing a first beverage ingredient in an upper compartment and a second beverage ingredient in a lower compartment, with an upper lid covering the upper compartment and a lower lid covering the lower compartment.

A method is provided for forming a two component beverage 2 using a container 4 having two compartments, an upper compartment 6 and a lower compartment 8, each containing a beverage ingredient. The upper compartment 6 contains a first beverage ingredient 10, such as powdered milk, and the lower compartment 8 contains a second beverage ingredient 12, such as instant coffee, as illustrated in FIG. 2. The upper compartment 6 is preferably stacked above the lower compartment 8, such that access to the lower compartment 8 is through the upper compartment 6. This advantageously facilitates a consumer following a preferred order of combining the beverage ingredients 10 and 12 to form the two component beverage 2. That is, by at least partially blocking access to the second beverage ingredient 12 using the first beverage ingredient 10, the likelihood of a consumer following a preferred sequence—initially using the first beverage ingredient 10 and then subsequently adding the second beverage ingredient 12—can be increased.

Figure 4:
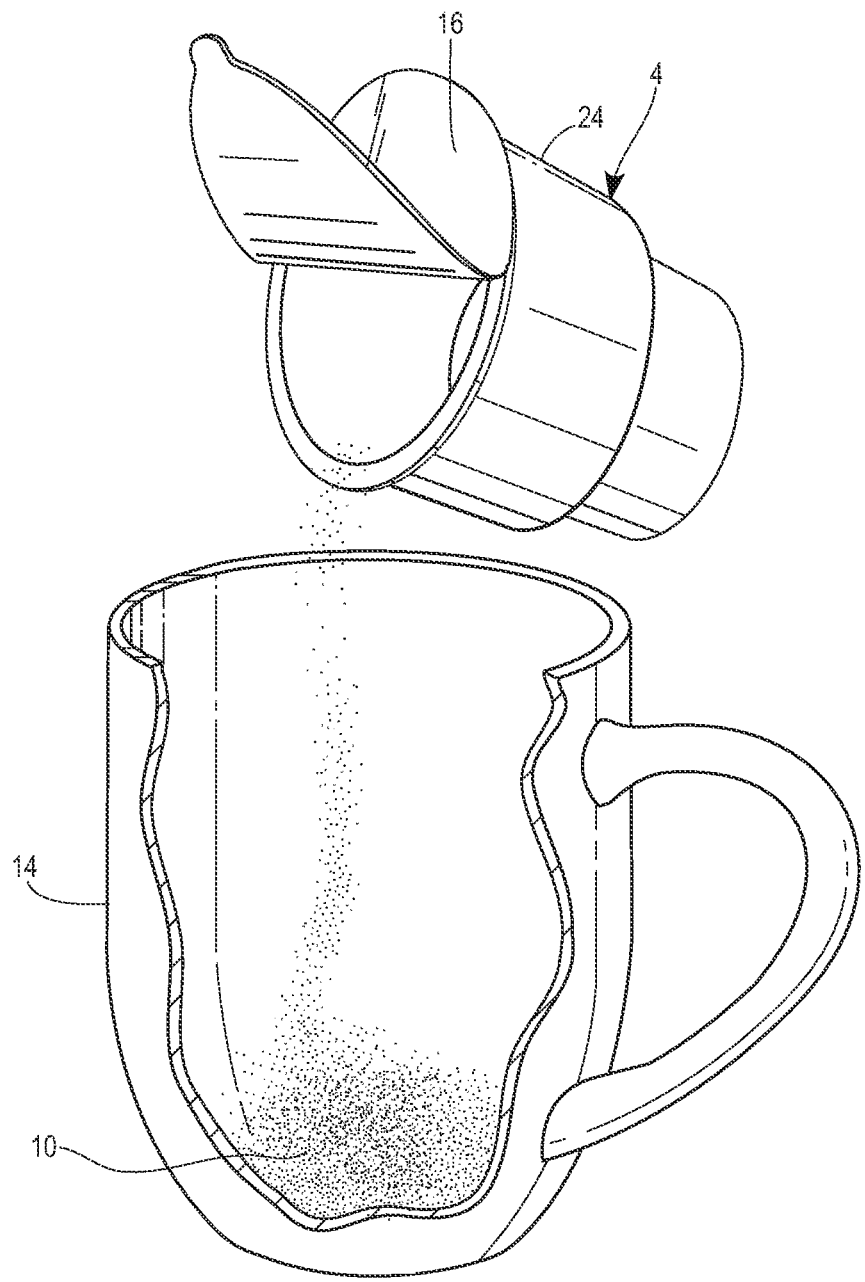
FIG. 4 is a perspective view of the first beverage ingredient being dispensed from the upper compartment of the container of FIG. 1 into a cup (shown partially broken away)
Figure 5:
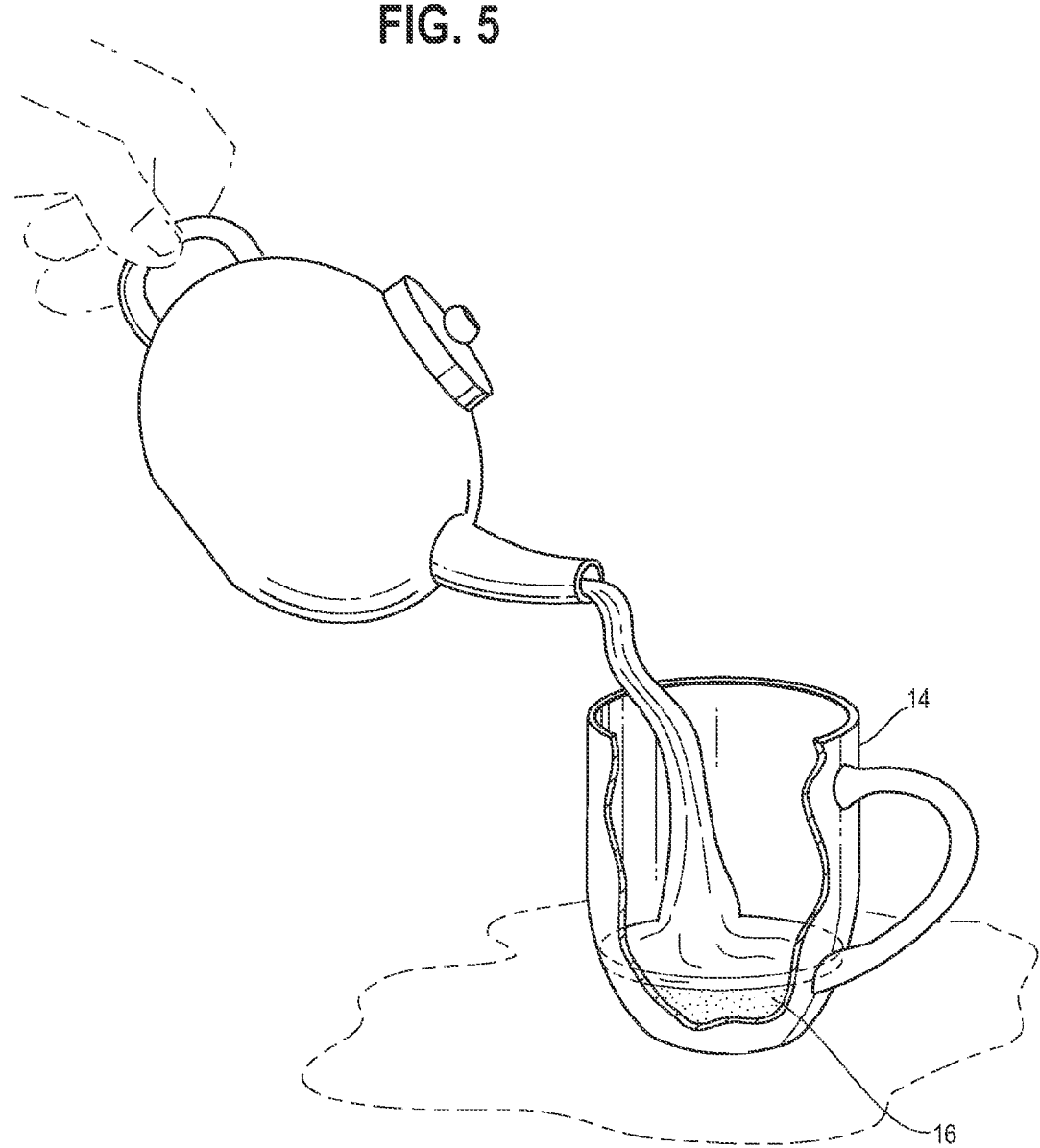
FIG. 5 is a perspective view of water being added to the first beverage ingredient in the cup to form a first beverage component.

The method includes accessing the upper compartment 6 and transferring the first beverage ingredient 10 into a cup 14, as illustrated in FIG. 4. The cup 14 can be any sort of vessel, such as a thermos, coffee mug or cup, drinking glass, or the like. The access can be accomplished by removal of an upper lid 16 covering the upper compartment 6, for example. Water or another aqueous medium can be added to the cup 14 in order to combine with the first beverage ingredient 10 to form a first beverage component 16, as illustrated in FIG. 5. Although the liquid can be measured using a device other than the container, the upper compartment of the container can optionally be sized to use for measuring the amount of liquid to be combined with the first beverage ingredient to form the first beverage component. Further, although the first beverage ingredient 10 can be dispensed into the cup 14 before adding liquid, the liquid could alternatively be added to the first beverage ingredient 10 when it remains in the container 4.

The method can also include accessing the lower compartment 8, after removal of the first beverage ingredient 10, in order to access the second beverage ingredient 12, as illustrated in FIG. 6. The access can be accomplished by removal of a lower lid 18 covering the lower compartment 8, which lid 18 being exposed upon removal of the first beverage ingredient 10. Water or another aqueous medium can be added to the second beverage ingredient 12 to form a second beverage component 20, as illustrated in FIG. 7. Preferably, though not necessarily, the second beverage component 20 can be formed in the container 4. This advantageously can further contribute to a consumer following a preferred sequence of making the two component beverage 2. This is because the second beverage component 20 would be made after removal of the first beverage ingredient 10 and, if the container 4 is sized smaller than the resultant volume of the two component beverage 2, the likelihood of a consumer adding the first beverage component 16 to the container 4 to combine with the second beverage component is reduced 20. To facilitate measuring the amount of liquid to be added to container 4, indicia 22 comprising a fill line indicator can be provided on a sidewall 24 of the container 4, such as by embossing, printing or the like. The indicia 22 can optionally be of a differing texture and/or color than the adjacent portion of the sidewall 24 to enhance visibility, such as if remnants of the first beverage ingredient 10 remain on the sidewall 24.

Figure 8:
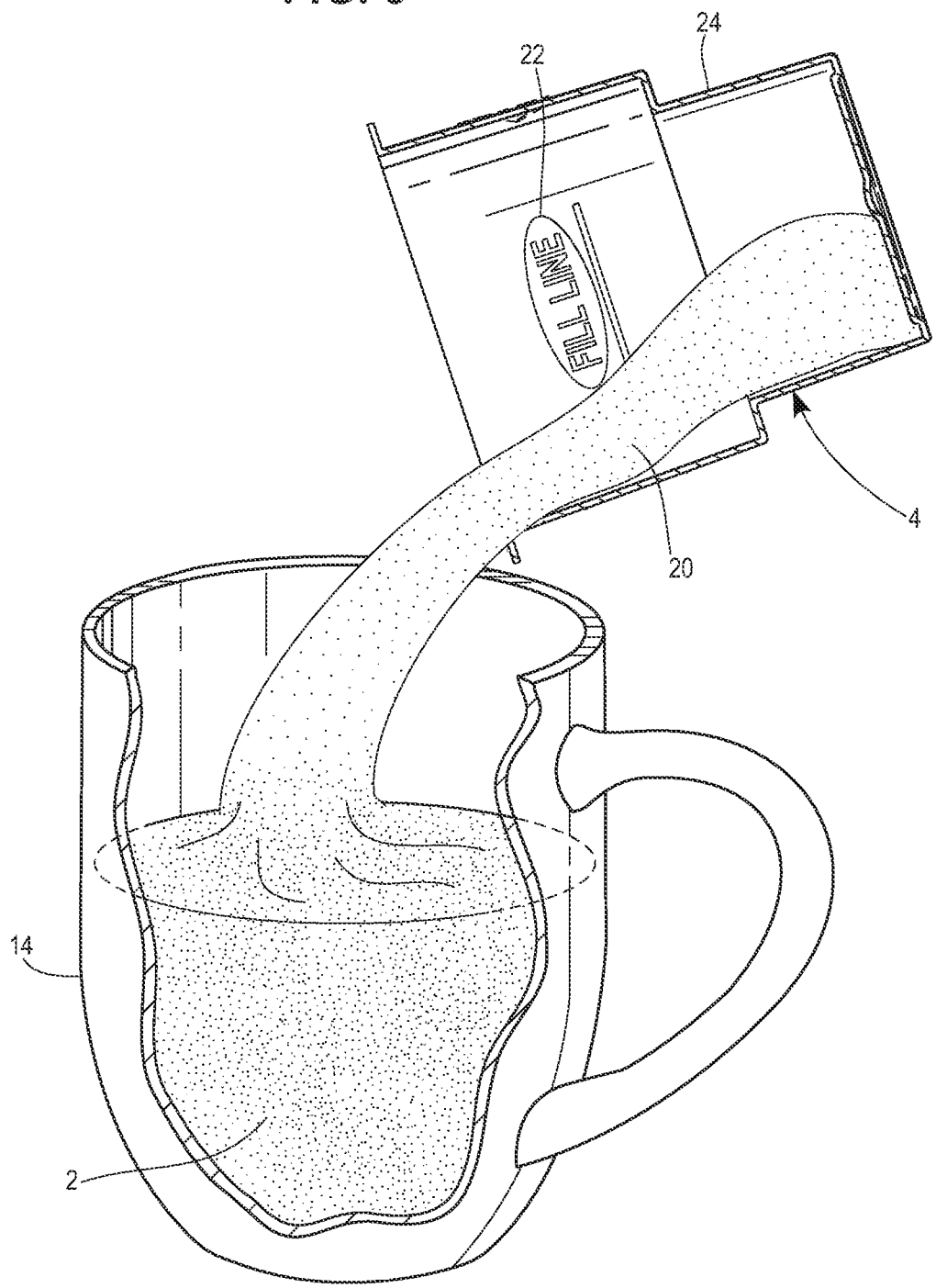
FIG. 8 is a section view of the second beverage component being dispensed from the container of FIG. 1 and combined in the cup with the first beverage component to form a two component beverage.

After formation of the first beverage component 16 in the cup 14 and formation of the second beverage component 20 in the container 4, the second beverage component 20 can be poured from the container 4 and into the cup 14 to combine with the first component 16 to form the two component beverage 2, as illustrated in FIG. 8.

Stirring or other mixing, other than the pouring, can be used to make or combine the beverage components. In an exemplary form, the first beverage ingredient can be powdered milk and the second beverage ingredient can be instant coffee. The liquid for forming both beverage components can be hot water, and the resultant beverage formed by adding the beverage component formed from the instant coffee to the beverage component formed from the powdered milk can be a latte. However, other ingredients can be used and/or the relative positions switched in order to form different two component beverages. Moreover, other components can be included to form a beverage having multiple components greater than two in number.

Figure 1:
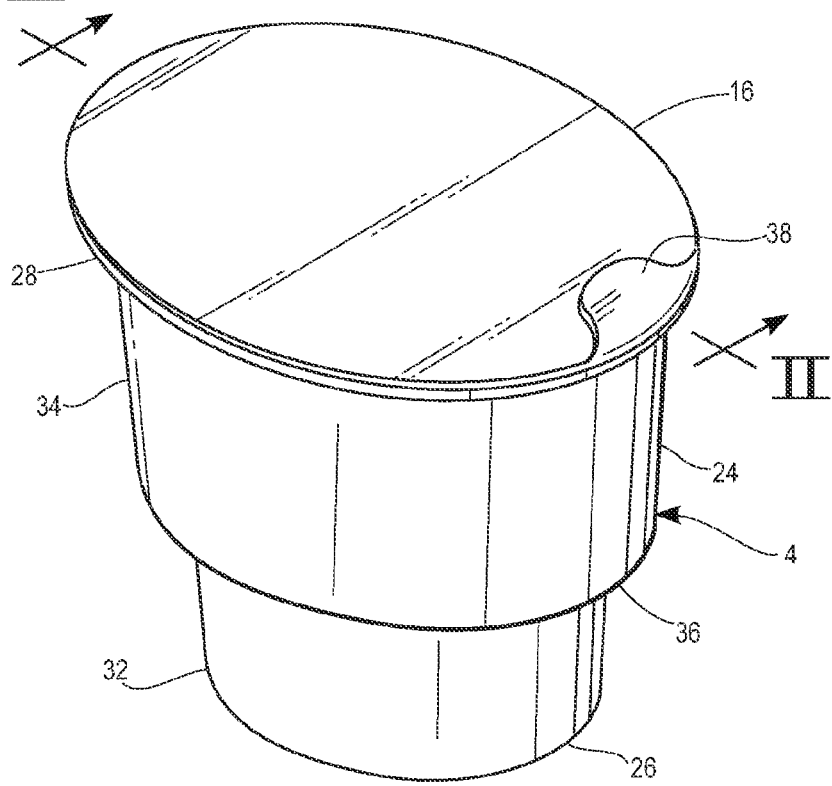
FIG. 1 is perspective view of an exemplary embodiment of a two compartment container containing ingredients for use with forming a two component beverage.
Figure 3:
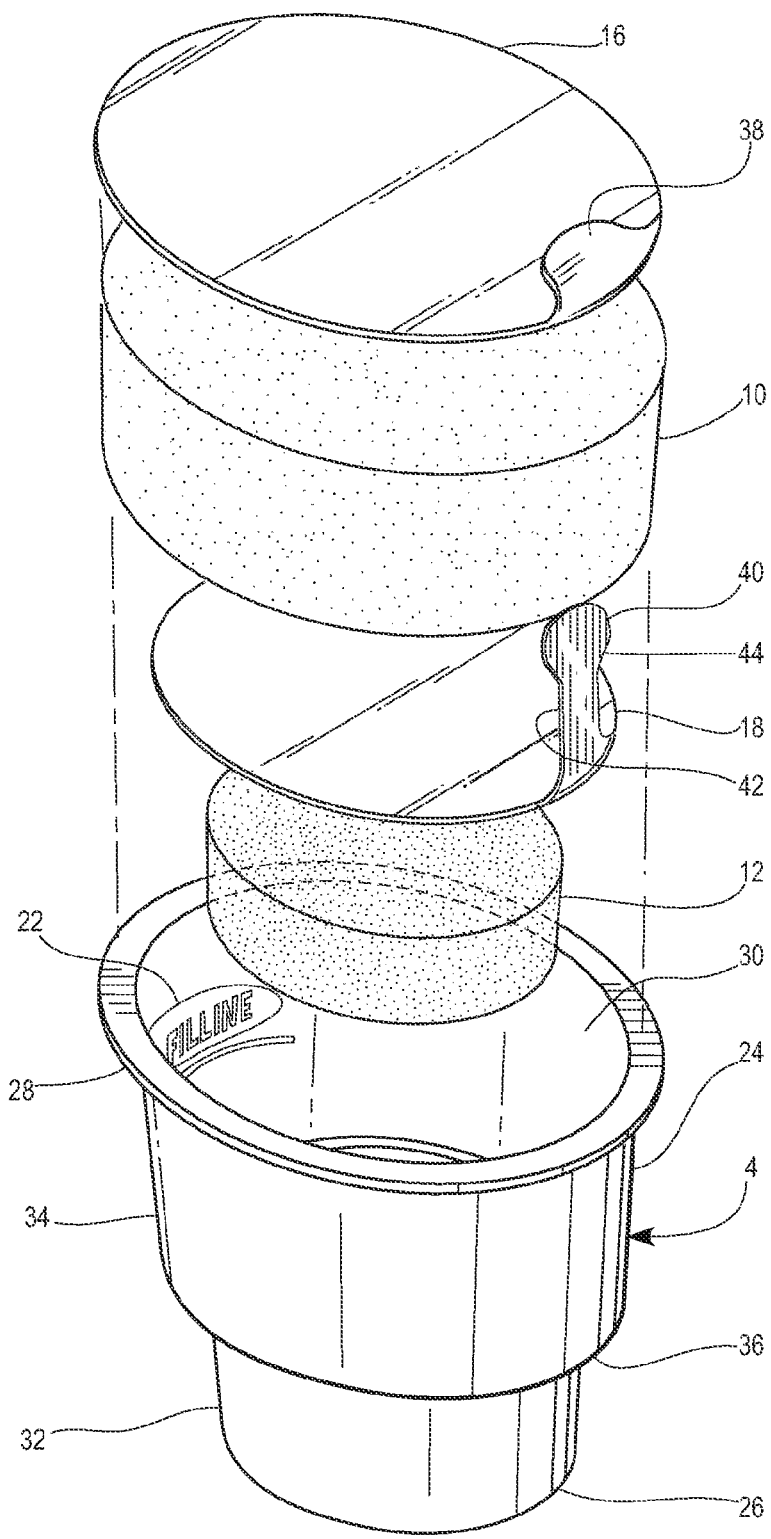
FIG. 3 is an exploded view of the two compartment container of FIG. 1.

Turning to the details of a first exemplary embodiment of the two compartment container 4 for use with the method of forming a two component beverage 2, and with reference to FIGS. 1-3, the container 4 includes a bottom wall 26 with the sidewall 24 upstanding therefrom. The sidewall 24 extends from the bottom wall 26 and terminates at a peripheral flange 28 that surrounds an access opening 30. The sidewall 24 includes a lower segment 32, adjacent the bottom wall 26, and an upper segment 34, adjacent the flange 28. The lower segment 32 has a smaller circumference than the upper segment 34 such that a step 36 is formed between the two segments. The container 4 is of thin-walled construction, such that the inner contour generally is the same as the outer contour.

The lower compartment 8 is bounded by the bottom wall 26, the lower segment 32 of the sidewall 24 and, when present, the lower lid 18 sealed to the inner surface of the step 36. The second beverage ingredient 12 is stored in the lower compartment 8. The upper compartment 6 is bounded by the lower lid 18, the upper segment of the sidewall 34, and the upper lid 16, when present, sealed to the peripheral flange 28. The first beverage ingredient 10 is stored in the upper compartment 6.

The positioning of the first beverage ingredient 10 above the second beverage ingredient 12 ensures that the first beverage ingredient 10 must be accessed in order to subsequently access the second beverage ingredient 12. More specifically, during intended use, the first beverage ingredient 10 blocks access to the lower lid 18 and thus the second beverage ingredient 12 therebelow when the first beverage ingredient 10 is in the upper compartment 6. Once the first beverage ingredient 10 is removed, access to the lower lid 18 and thus the second beverage ingredient 12 is more readily available.

The upper and lower lids 16 and 18 can optionally be configured to facilitate removal. The upper lid 16 can include a tab 38 that is provided in a folded position overlying the remainder of the upper lid 16, as illustrated in FIGS. 1-3. The tab 38 can be unfolded to extend beyond the perimeter of the peripheral flange 28 to permit gripping of the tab 38. The tab 38 can then be used to pull the upper lid 18 from the flange 28. The lower lid 18 can also include a tab 40. The tab 40 of the lower lid has an extension 42 with an enlarged head 44 at one end opposite the remainder of the tab 40, as shown in FIG. 3. The tab 40 of the lower lid can be positioned against the inner portion of the upper segment 34 of the sidewall 24, generally perpendicular to the lower lid 18, as illustrated in FIG. 2. The tab 40 is at least partially covered with the first beverage ingredient 10 until the first beverage ingredient 10 is removed. Once the first beverage ingredient 10 is removed, the tab 40 of the lower lid 18 can be pulled away from the sidewall 24, gripped and pulled to remove the lower lid 18 to access the second beverage ingredient 12 disposed in the lower compartment 8.

While the peripheral flange 28 of the two compartment container 4 of FIGS. 1-3 can be used for handling, alternative configurations of the two compartment container 4 can be differently configured. In a second exemplary embodiment of the two compartment container 4, illustrated in FIGS. 9 and 10 and with the same reference numbers used for like parts, the lower segment 32 of the sidewall 24 includes a plurality of radially outwardly extending ribs 46 spaced by indentations 48. The remainder of the container 4 is generally the same as in the prior embodiment, having an upper compartment 6 with a peripheral flange 28 and first beverage ingredient 10 stacked above a lower compartment 8 with a second beverage ingredient 12, with each compartment covered by a lid 16 and 18, respectively. In addition to using the peripheral flange 28 for handling, the outward edges of the ribs 46 provide another option for handling of the container 4.

Figure 11:
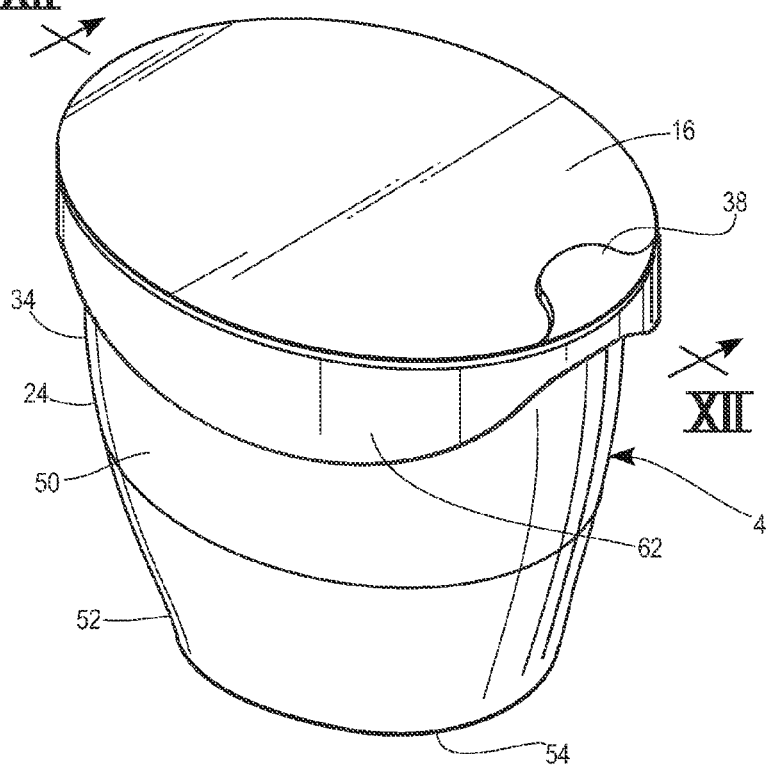
FIG. 11 is perspective view of another alternative exemplary embodiment of a two compartment container containing ingredients for use with forming a two component beverage.
Figure 12:
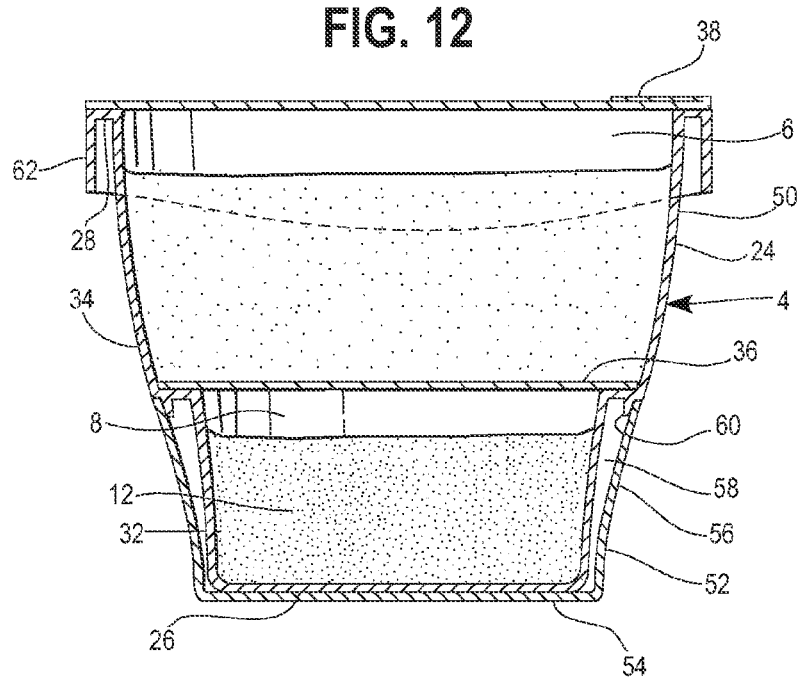
FIG. 12 is a section view of the container of FIG. 11 taken along line XII-XII thereof, and showing a first beverage ingredient in an upper compartment and a second beverage ingredient in a lower compartment, with an upper lid covering the upper compartment and a lower lid covering the lower compartment.
Figure 13:
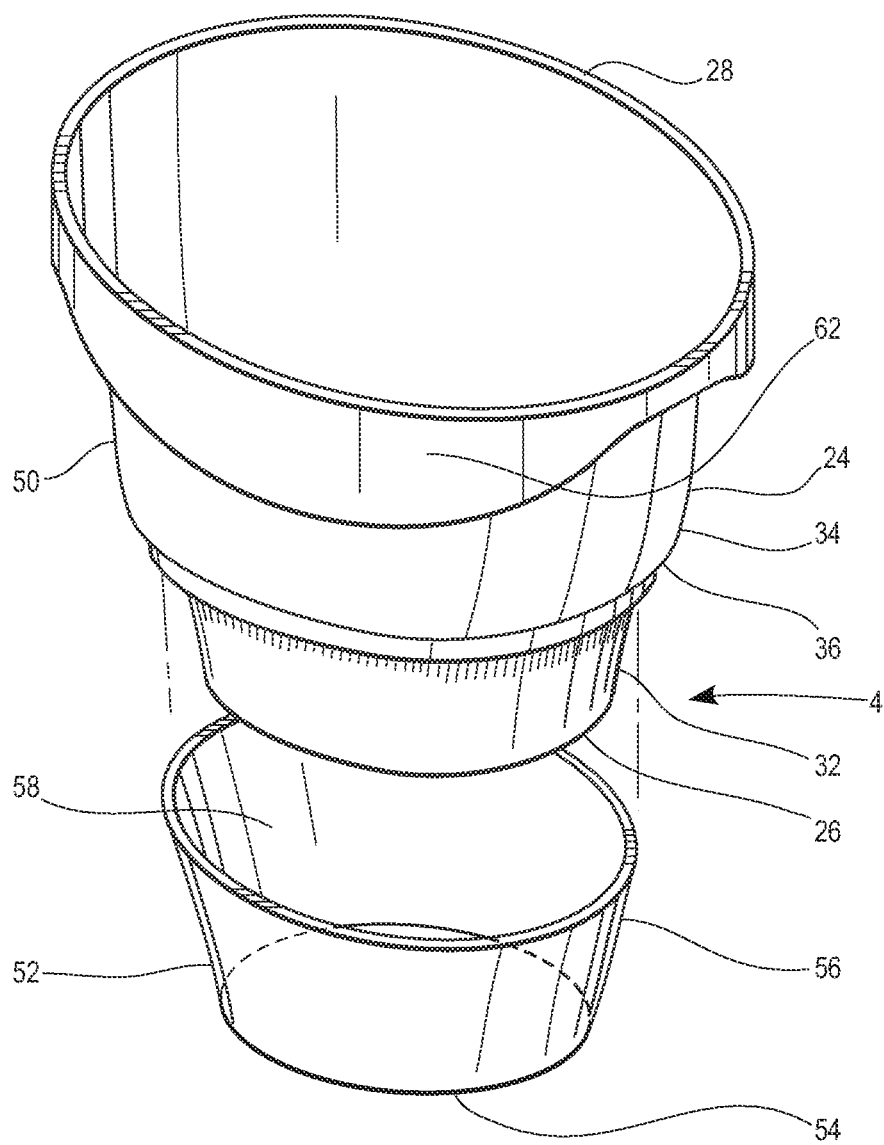
FIG. 13 is an exploded view of the empty container of FIG. 11 showing two parts that are combined to form the two container.

Yet another option for handling other than the flange 28 is provided in a third exemplary embodiment of the two compartment container 4, illustrated in FIGS. 11-13 and with the same reference numbers used for like parts. In this embodiment, the container 4 is formed from separate inner and outer parts 50 and 52. The inner part 50 includes a bottom wall 26, a lower segment 32, a step 36, and an upper segment 34 with a peripheral flange 28. An upper lid 16 is sealed to the peripheral flange 28 and the lower lid 18 is sealed to the inner surface of the step 36. The outer part 52 is cup-shaped, having a bottom wall 54 with an upstanding sidewall 56 defining an opening 58. The outer part 52 is sized to fit around the lower segment 32 of the sidewall 24 and the bottom wall 26 of the container 4. However, the sidewall 56 of the outer part 52 is spaced from the lower segment 32 of the sidewall 24 of the container 4 to provide a buffer region or void 58 between the two in order to facilitate handling by holding the outer part 52 of the container.

To facilitate assembly of the inner and outer parts 50 and 52 of the third exemplary embodiment, the outer side of the step 36 can include a depending lip 60 positioned slightly inwardly from the outer edge of the step 36. The upper segment 34 of the sidewall 24 of the outer part 52 is configured to abut against a radially-outward facing surface of the lip 60 and/or the downwardly facing outer side of the step 36. Preferably, though not necessarily, the upper segment 34 of the sidewall 24 of the inner part 50 and the side wall 56 of the outer part 52 are configured to be substantially flush when the inner and outer parts 50 and 52 are joined together. Although a seam may be visible, the contours can match. The joining of the inner and outer parts 50 and 52 can be accomplished using any suitable method, such as welding, adhesive, snap-fit, friction-fit, or the like.

Figure 14:
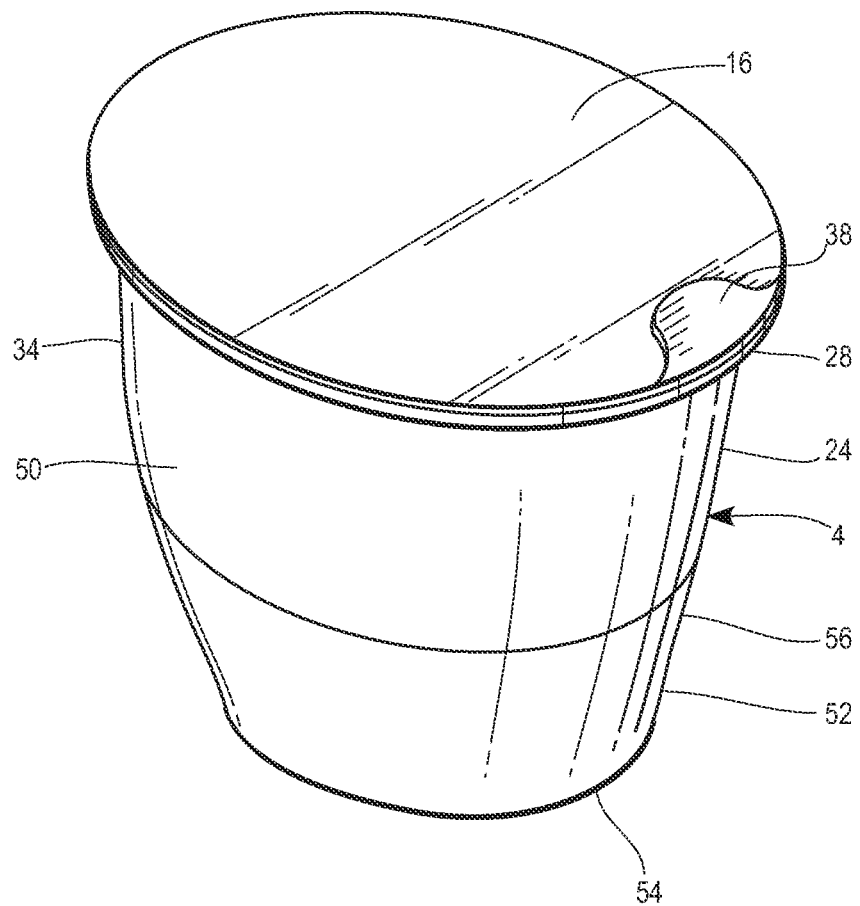
FIG. 14 is a perspective view of yet another alternative exemplary embodiment of a two compartment container containing ingredients for use with forming a two component beverage.
Figure 15:
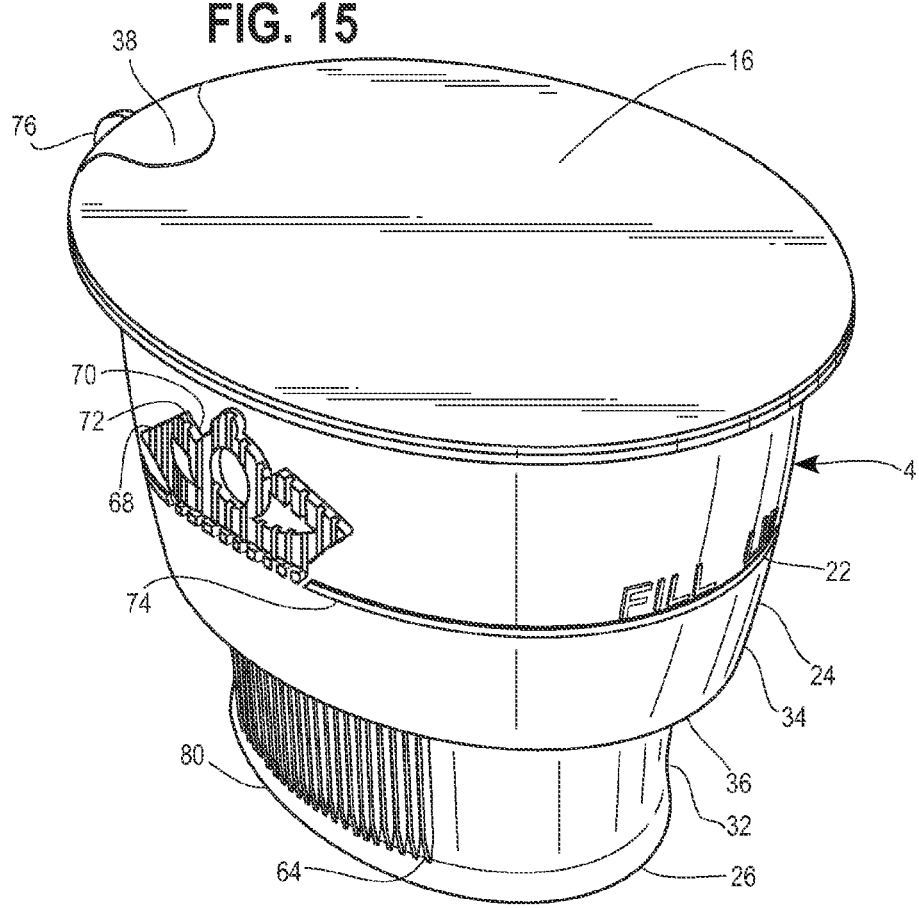
FIG. 15 is a perspective view of another alternative exemplary embodiment of a two compartment container containing ingredients for use with forming a two component beverage.
Figure 16:
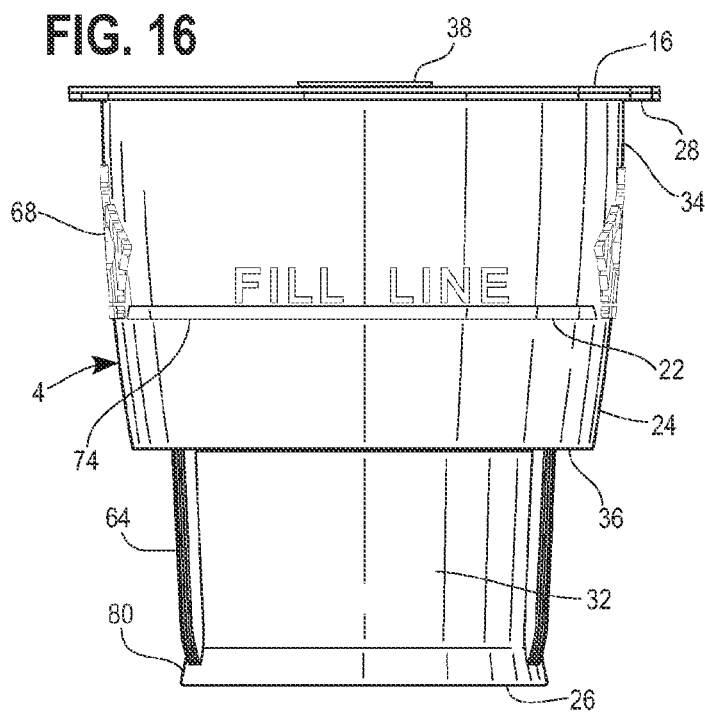
FIG. 16 is a front elevation view of the container of FIG. 15.
Figure 21:
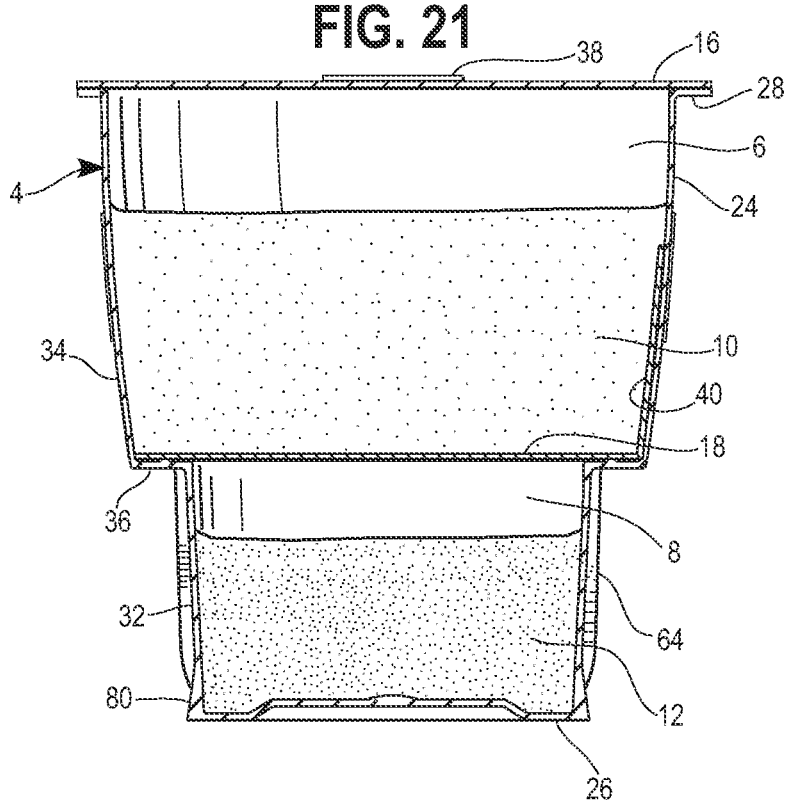
FIG. 21 is a section view of the container of FIG. 15 taken along line XXI-XXI of FIG. 18.
Figure 22:
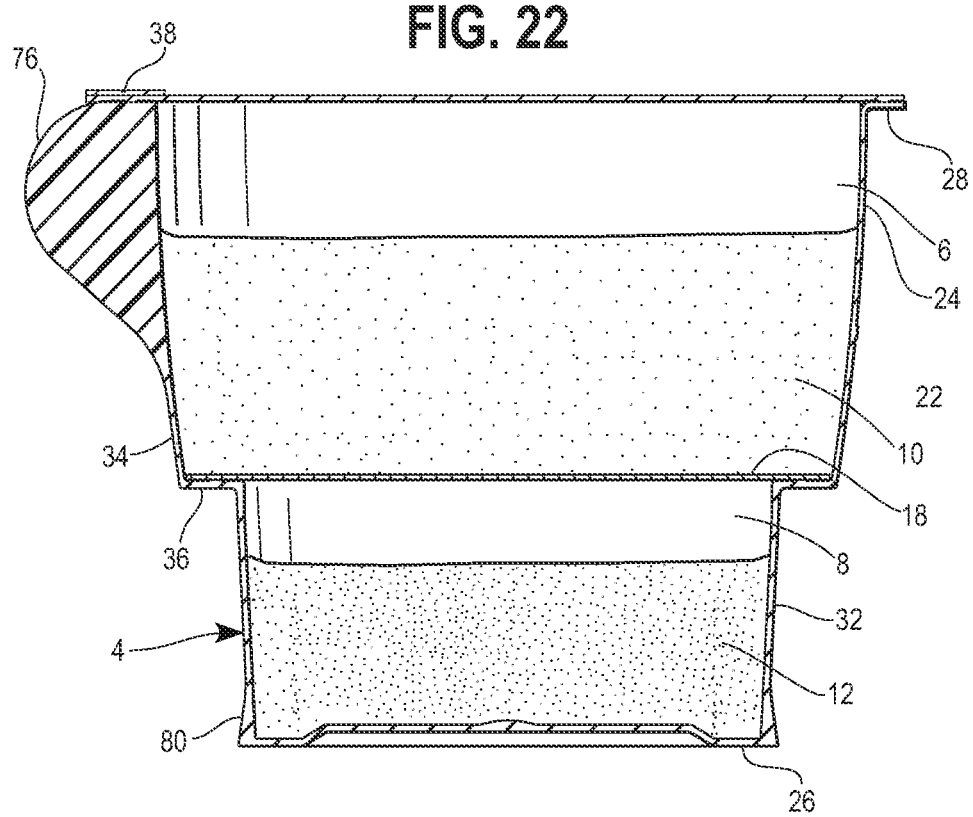
FIG. 22 is a section view of the container of FIG. 15 taken along line XXII-XXII of FIG. 18 and the container of FIG. 23 taken along line XXII-XXII of FIG. 26.
Figure 23:
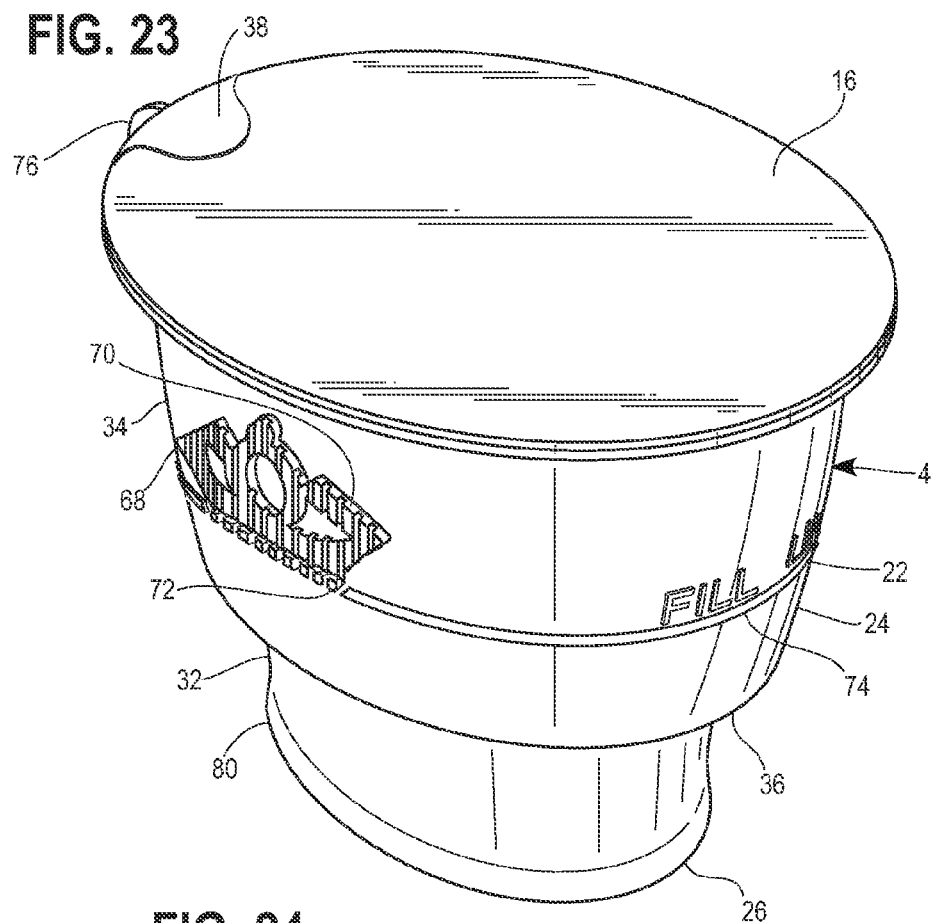
FIG. 23 is a perspective view of yet another alternative exemplary embodiment of a two compartment container containing ingredients for use with forming a two component beverage.
Figure 24:
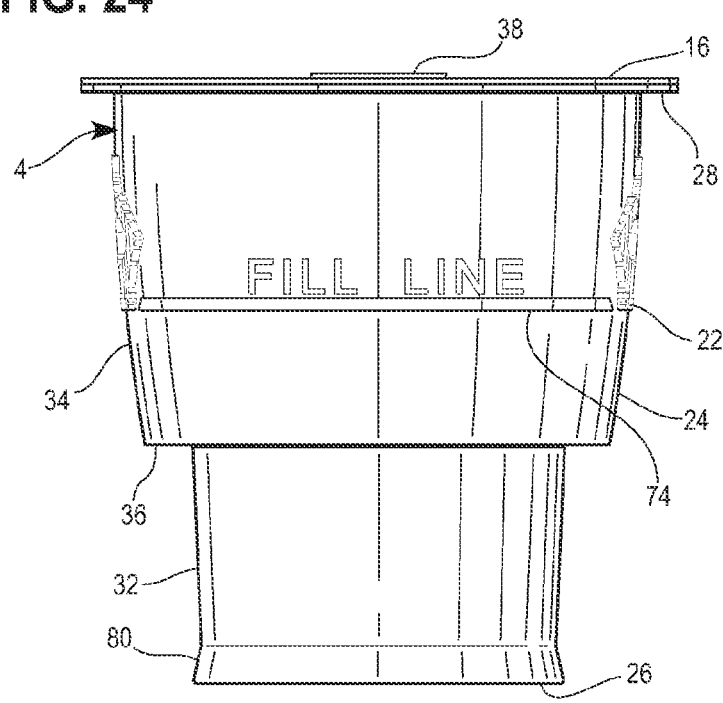
FIG. 24 is a front elevation view of the container of FIG. 23.

The flange 28 of the third exemplary embodiment can differ from those of the first two embodiments. In particular, the flange 28 can have a downturned segment 62 at the outer portion of the peripheral flange 28. The downturned segment 62 can extend a short distance before terminating, and can be spaced from the upper segment 34 of the sidewall 24 of the container 4. The lower edge of the downturned segment 62 can be arcuate and vary from one position to another. For example, the height of the downturned segment 62 can be at a maximum along a major side of the container 4 and at a minimum along a minor side of the container 4, as illustrated in FIGS. 11 and 13. The variation in the height of the downturned segment 62 can facilitate handling as well as provide an aesthetic appearance. However, the downturned segment 62 can be omitted, as in a fourth exemplary embodiment of the two compartment container 4, illustrated in FIG. 14 and with the same reference numbers used for like parts. The fourth embodiment can have the same construction as the third embodiment, with the exception of a perpendicular flange 28 lacking the downturned segment 62 of the third embodiment.

In a fifth exemplary embodiment of the two compartment container 4, illustrated in FIGS. 15-22 and with the same reference numbers used for like parts, the lower segment 32 of the sidewall 24 includes a plurality of radially outwardly extending ribs 64 spaced by indentations 66. Unlike the ribs 46 of the second exemplary embodiment, the ribs 64 of the fifth exemplary embodiment optionally do not extend around the entirety of the periphery of the lower segment 32 of the sidewall 24. Instead, the ribs 64 are optionally disposed only on a pair of opposing sides of the container 4, preferably, the longer of the two sides in the illustrated oval-shaped container. The ribs 64 can be parallel to each other. In addition to using the peripheral flange 28 for handling, the outward edges of the ribs 64 provide another option for handling of the container 4. The ribs 64 and indentations 66 can extend at any angle, such as horizontal, vertical (as illustrated) or other angles. The ribs 64 and indentations 66 can be incorporated into any of the embodiments described herein.

Another option for handling of the container 4 is also incorporated into the fifth exemplary embodiment of the two compartment container 4. In particular, a logo 68, indicia or the like can be formed on the sidewall 24, such as the upper segment 34 of the sidewall 24, and can be defined by a plurality of outwardly protruding ribs 70 separated by recesses 72. Although the ribs 70 and recesses 72 are illustrated as extending vertically, they can instead extend horizontally or at other angles. The recesses can optionally be of a partial depth, as illustrated, such that the thickness of the sidewall 24 at the recesses 72 is greater than the thickness of the sidewall 24 adjacent to the logo 68. This additional thickness can assist in providing further handling capabilities. Advantageously, the incorporation of ribs 70 and recesses 72 permits the logo 68 to serve two functions: conveying information, such as brand or the like; and providing another option for handling of the container 4. A wide variety of sizes and locations of the logo 68 can be suitable depending upon the configuration and intended use of the container 4. A protruding fill line 74 can also extend about the periphery of the upper segment 34 of the sidewall 24. The use of a logo 68 formed of ribs 70 and recesses 72 can be incorporated into any of the embodiments described herein, as can the protruding fill line 74.

Yet another option for handling of the container 4 is also incorporated into the fifth exemplary embodiment of the two compartment container 4 in the form of a handle 76. The handle can extend radially outward from the upper segment 34 of the sidewall 24, and can have arcuate edges as illustrated in FIG. 17. Also as illustrated in FIG. 17, the handle 76 can include an optional indentation 78 to facilitate gripping, such as the illustrated circular indentation 78. The indentation can include texturing or the like for further facilitating gripping. The handle 76 can be generally planar, except for the optional indentation 78. The handle 76 and optional indentation 78 can be incorporated into any of the containers 4 described herein.

The remainder of the container 4 of the fifth exemplary embodiment is generally the same as in the first and second embodiments, having an upper compartment 6 with a peripheral flange 28 and first beverage ingredient 10 stacked above a lower compartment 8 with a second beverage ingredient 12, with each compartment covered by a lid 16 and 18, respectively. However, a difference is that the bottom end portion 80 of the lower segment 32 of sidewall is outwardly flared, providing both aesthetic appeal and a wider base.

The ribs 64 and indentations 66 can be omitted, as in a sixth exemplary embodiment of the two compartment container 4, illustrated in FIGS. 23-29 and with the same reference numbers used for like parts. The sixth embodiment can have the same construction as the fifth embodiment, with the exception of the ribs 64 and indentations 66 of the fifth embodiment.

As mentioned above, the two compartment container 4 of the embodiments described herein is generally of thin-walled construction. The container 4 can formed container 4 be formed using thermoforming, injection molding or other suitable techniques. The material can be polypropylene-based, and can optionally have a barrier layer, although other materials, including other polymers, can also be suitable. Optionally, the material can be transparent or translucent in order to permit visual observation of the contents from the exterior of a sealed or partially sealed container 4.

The upper and lower lids 16 and 18 can be formed of foil laminates or other suitable materials. The lids can be rigid, and can be of any suitable configuration providing a barrier. The upper and lower lids 16 and 18 can optionally be suitable for heat or ultrasonic welding to the peripheral flange 28 and the step 36, respectively, although other ways of sealing can be utilized, such as adhesives or the like. Preferably, though not necessarily, the step 36 has a width and the upper compartment 6 has a size that are configured to permit insertion of a sealing tool for sealing the lower lid 18 against the inner surface of the step 36.

Although the shape of the exemplary embodiments of the container is generally curved or rounded, the container 4 can have a major axis and a minor axis, both perpendicular to a longitudinal axis extending through the bottom wall 26 and the upper lid 16. The major axis can be greater than the minor axis such that the container 4 is oblong. When viewed from the top, the container 4 has a generally ovular appearance. However, other shapes of the container 4 can also be suitable.

The drawings and the foregoing descriptions are not intended to represent the only forms of the method and two compartment containers in regards to the steps and details of construction. Changes in form and in proportion of parts, variations, additions or removal of steps, as well as the substitution of equivalents, are contemplated as circumstances may suggest or render expedient.

The invention claimed is:
1. A method of forming a two component beverage in a cup using a two compartment container, the method comprising:
 accessing an upper compartment of the two compartment container containing a first beverage ingredient;
 blocking access to a lower compartment of the two compartment container using a lower lid that defines a bottom end of the upper compartment and an upper lid that defines a top end of the upper compartment;

emptying the first beverage ingredient from the two compartment container into the cup prior to accessing the lower compartment of the two compartment container containing a second beverage ingredient;

combining a liquid with the first beverage ingredient in the cup to form a first beverage component;

combining a liquid with the second beverage ingredient in the two compartment container to form a second beverage component; and pouring the second beverage component into the cup to combine with the first beverage component to form the two component beverage.

2. The method of claim 1, wherein the step of accessing an upper compartment of the two compartment container containing a first beverage ingredient further includes the step of removing an upper compartment lid from the container.

3. The method of claim 2, wherein the step of accessing the lower compartment of the two compartment container containing a second beverage ingredient further includes the step of first removing a lower compartment lid from the container.

4. The method of claim 3, wherein the step of combining a liquid with the second beverage ingredient in the two compartment container to form a second beverage component includes measuring the liquid using the container.

5. The method of claim 1, wherein the step of combining a liquid with the second beverage ingredient in the two compartment container to form a second beverage component includes filling the lower compartment and at least a part of the upper compartment of the two compartment container with the liquid.

6. The method of claim 1, wherein the liquid combined with the first beverage ingredient in the cup to form the first beverage component is water and the liquid combined with the second beverage component in the container is water.

7. The method of claim 1, further comprising the step of using the upper compartment of the two compartment container to measure the liquid prior to the step of combining the liquid with the first beverage ingredient in the cup to form the first beverage component.

8. The method of claim 1, further comprising the step of holding the container using means for handling the container prior to the step of pouring the second beverage component into the cup to combine with the first beverage component to form the two component beverage.

9. The method of claim 1, wherein the combining a liquid with the first beverage ingredient in the cup to form a first beverage component comprises combining the liquid with the first beverage ingredient in the cup to form the first beverage component prior to the pouring of the second beverage component into the cup.

10. The method of claim 1, wherein the accessing an upper compartment of the two compartment container containing a first beverage ingredient includes accessing the upper compartment of the two compartment container containing the first beverage ingredient through an access opening of the two compartment container, and wherein the combining a liquid with the second beverage ingredient in the two compartment container to form a second beverage component includes pouring the liquid onto the second beverage component through the access opening of the two compartment container.

11. The method of claim 10, wherein the pouring of the second beverage component into the cup to combine with the first beverage component to form the two component beverage includes pouring the second beverage component through the access opening into the cup to combine with the first beverage component to form the two component beverage.

\* \* \* \* \*